(12) United States Patent
Levitan et al.

(10) Patent No.: US 7,783,870 B2
(45) Date of Patent: Aug. 24, 2010

(54) BRANCH TARGET ADDRESS CACHE

(75) Inventors: David S. Levitan, Austin, TX (US);
William E. Speight, Austin, TX (US);
Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/837,893

(22) Filed: Aug. 13, 2007

(65) Prior Publication Data

US 2009/0049286 A1    Feb. 19, 2009

(51) Int. Cl.
*G06F 9/38* (2006.01)
*G06F 9/32* (2006.01)

(52) U.S. Cl. .................. 712/238; 712/237; 712/239

(58) Field of Classification Search .......... 712/234, 712/237, 238, 239
See application file for complete search history.

(56) References Cited

U.S. PATENT DOCUMENTS

| | | | | |
|---|---|---|---|---|
| 5,163,140 A | * | 11/1992 | Stiles et al. | 711/140 |
| 5,327,547 A | * | 7/1994 | Stiles et al. | 711/137 |
| 5,515,518 A | * | 5/1996 | Stiles et al. | 712/239 |
| 5,577,217 A | * | 11/1996 | Hoyt et al. | 712/200 |
| 5,682,492 A | * | 10/1997 | McFarland et al. | 712/214 |
| 5,835,754 A | * | 11/1998 | Nakanishi | 712/239 |
| 6,067,616 A | * | 5/2000 | Stiles et al. | 712/239 |
| 6,119,222 A | * | 9/2000 | Shiell et al. | 712/238 |
| 6,425,075 B1 | * | 7/2002 | Stiles et al. | 712/239 |
| 2005/0268076 A1 | * | 12/2005 | Henry et al. | 712/239 |

OTHER PUBLICATIONS

McFarling, S. "WRL Technical Note TN-36: Combining Branch Predictors" (Jun. 1993).*
Yeh, T.Y. and Patt, Y.N. "Alternative Implementations of Two-Level Adaptive Branch Prediction" (1992), ACM, pp. 451-461.*
Shen, J.P. and Lipasti, M.H. "Modern Processor Design: Fundamentals of Superscalar Processors". N.Y., McGraw Hill Higher Education, 2005. p. 574-576.*

* cited by examiner

*Primary Examiner*—Aimee J Li
(74) *Attorney, Agent, or Firm*—Dillon & Yudell LLP

(57) ABSTRACT

A processor includes an execution unit and instruction sequencing logic that fetches instructions from a memory system for execution. The instruction sequencing logic includes branch logic that outputs predicted branch target addresses for use as instruction fetch addresses. The branch logic includes a level one branch target address cache (BTAC) and a level two BTAC each having a respective plurality of entries each associating at least a tag with a predicted branch target address. The branch logic accesses the level one and level two BTACs in parallel with a tag portion of a first instruction fetch address to obtain a first predicted branch target address from the level one BTAC for use as a second instruction fetch address in a first processor clock cycle and a second predicted branch target address from the level two BTAC for use as a third instruction fetch address in a later second processor clock cycle.

17 Claims, 6 Drawing Sheets

BRANCH TARGET ADDRESS CACHE

BACKGROUND OF THE INVENTION

1. Technical Field

The present invention relates in general to data processing and, in particular, to branch prediction. Still more particularly, the present invention relates to a data processing system, processor and method of data processing with an improved branch target address cache (BTAC).

2. Description of the Related Art

A state-of-the-art microprocessor can comprise, for example, a cache for storing instructions and data, an instruction sequencing unit for fetching instructions from the cache, ordering the fetched instructions, and dispatching the fetched instructions for execution, one or more sequential instruction execution units for processing sequential instructions, and a branch processing unit (BPU) for processing branch instructions.

Branch instructions processed by the BPU can be classified as either conditional or unconditional branch instructions. Unconditional branch instructions are branch instructions that change the flow of program execution from a sequential execution path to a specified target execution path and which do not depend upon a condition supplied by the occurrence of an event. Thus, the branch specified by an unconditional branch instruction is always taken. In contrast, conditional branch instructions are branch instructions for which the indicated branch in program flow may be taken or not taken depending upon a condition within the processor, for example, the state of specified condition register bit(s) or the value of a counter.

Conditional branch instructions can be further classified as either resolved or unresolved based upon whether or not the condition upon which the branch depends is available when the conditional branch instruction is evaluated by the BPU. Because the condition upon which a resolved conditional branch instruction depends is known prior to execution, resolved conditional branch instructions can typically be executed and instructions within the target execution path fetched with little or no delay in the execution of sequential instructions. Unresolved conditional branches, on the other hand, can create significant performance penalties if fetching of sequential instructions is delayed until the condition upon which the branch depends becomes available and the branch is resolved.

Therefore, in order to minimize execution stalls, some processors speculatively predict the outcomes of unresolved branch instructions as taken or not taken. Utilizing the result of the prediction, the instruction sequencing unit is then able to fetch instructions within the speculative execution path prior to the resolution of the branch, thereby avoiding a stall in the execution pipeline in cases in which the branch is subsequently resolved as correctly predicted. Conventionally, prediction of unresolved conditional branch instructions has been accomplished utilizing static branch prediction, which predicts resolutions of branch instructions based upon criteria determined prior to program execution, or utilizing dynamic branch prediction, which predicts resolutions of branch instructions by reference to branch history accumulated on a per-address basis within a branch history table (BHT) and/or branch target address cache (BTAC).

Modern microprocessors require multiple cycles to fetch instructions from the instruction cache, scan the fetched instructions for branches, and predict the outcome of unresolved conditional branch instructions. If any branch is predicted as taken, instruction fetch is redirected to the new, predicted address. This process of changing which instructions are being fetched is called "instruction fetch redirect". During the several cycles required for the instruction fetch, branch scan, and instruction fetch redirect, instructions continue to be fetched along the not taken path; in the case of a predicted-taken branch, the instructions within the predicted-taken path are discarded, resulting in decreased performance and wasted power dissipation.

Several existing approaches are utilized to reduce or to eliminate the instruction fetch redirect penalty. One commonly used method is the implementation of a BTAC that in each entry caches the branch target address of a taken branch in association with the branch instruction's tag. In operation, the BTAC is accessed in parallel with the instruction cache and is searched for an entry whose instruction tag matches the fetch address transmitted to the instruction cache. If such a BTAC entry exists, instruction fetch is redirected to the branch target address provided in the matching BTAC entry. Because the BTAC access typically takes fewer cycles than the instruction fetch, branch scan, and taken branch redirect sequence, a correct BTAC prediction can improve performance by causing instruction fetch to begin at a new address sooner than if there were no BTAC present.

However, in conventional designs, the BTAC access still generally requires multiple cycles, meaning that in the case of a BTAC hit at least one cycle elapses before the taken branch redirect. The interval between the BTAC access and the instruction fetch redirect represents a "bubble" during which no useful work is performed by the instruction fetch pipeline. Unfortunately, this interval tends to grow as processors achieve higher and higher operating frequencies and as BTAC sizes increase in response to the larger total number of instructions (i.e., "instruction footprint") of newer software applications.

SUMMARY OF THE INVENTION

The present invention provides an improved data processing system, processor and method of data processing employing an enhanced branch target address cache.

A processor includes an execution unit and instruction sequencing logic that fetches instructions from a memory system for execution. The instruction sequencing logic includes branch logic that outputs predicted branch target addresses for use as instruction fetch addresses. The branch logic includes a level one branch target address cache (BTAC) and a level two BTAC each having a respective plurality of entries each associating at least a tag with a predicted branch target address. The branch logic accesses the level one and level two BTACs in parallel with a tag portion of a first instruction fetch address to obtain a first predicted branch target address from the level one BTAC for use as a second instruction fetch address in a first processor clock cycle and a second predicted branch target address from the level two BTAC for use as a third instruction fetch address in a later second processor clock cycle.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
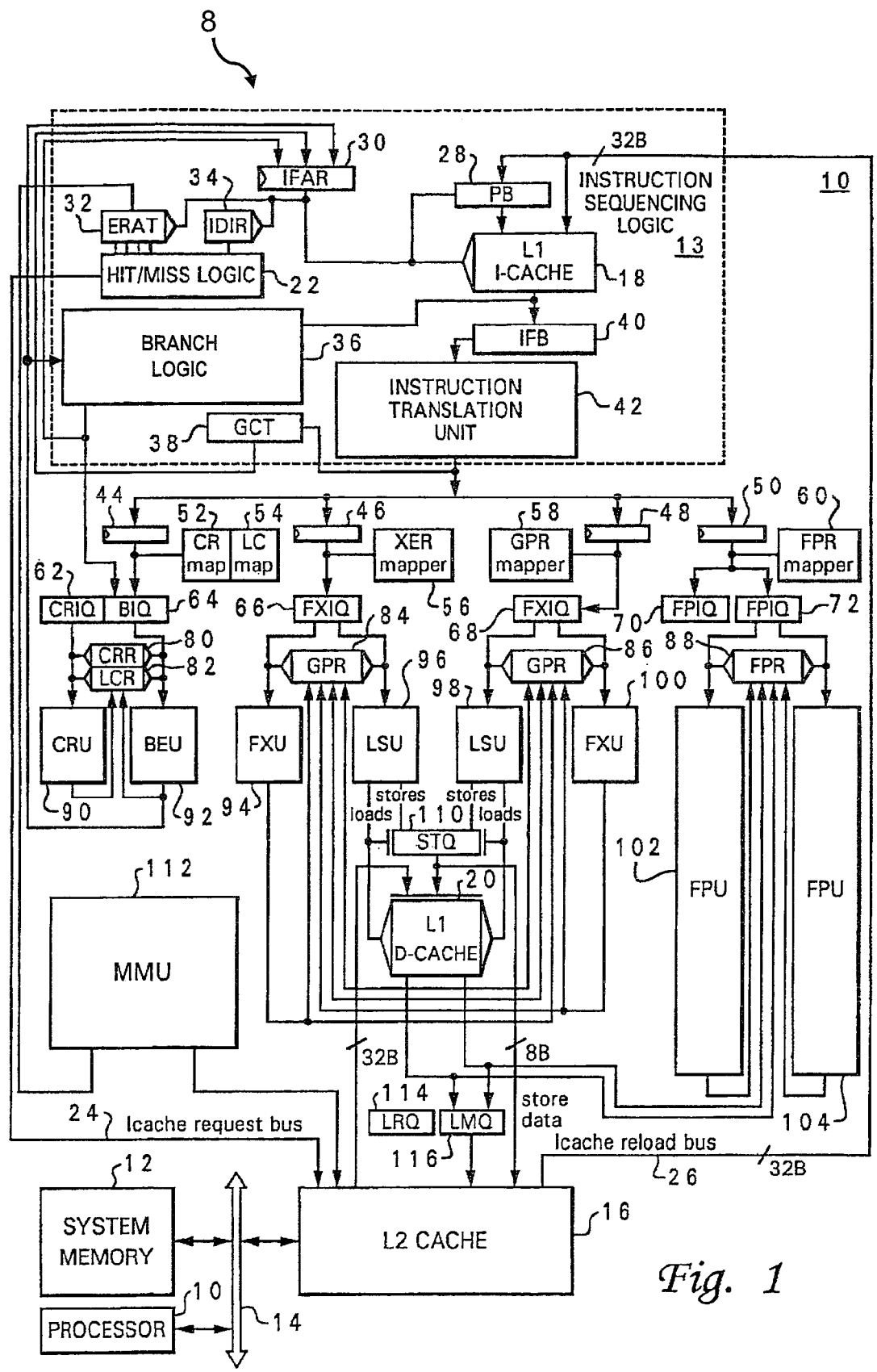
FIG. 1 is an exemplary embodiment of a data processing system in accordance with the present invention.

With reference now to FIG. 1, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a block of instructions (e.g., a 32-byte cache line) to be fetched from L1 I-cache 18 for processing. During each cycle, a new instruction fetch address (IFA) may be loaded into IFAR 30 from one of at least three sources: branch logic 36, which provides speculative branch target addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 (which is coupled to a memory management unit (MMU) 112) and lookup of the real address (RA) in I-cache directory 34, that the block of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the block of instructions specified by the EA in IFAR 30 resides in L1 cache 18, L1 I-cache 18 outputs the block of instructions to both branch logic 36 and to instruction fetch buffer (IFB) 40. As described further below with respect to FIG. 2, branch logic 36 scans the block of instructions for branch instructions and predicts the outcome of conditional branch instructions in the instruction block, if any. Following a branch prediction, branch logic 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the block of instructions received from L1 I-cache 18 until the block of instructions can be translated, if necessary, by an instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to one of latches 44, 46, 48 and 50 according to instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more registers within a register file by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically (i.e., possibly out-of-order) to the execution units of processor 10 for execution. In some embodiments, the instructions are also maintained in issue queues 62-72 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90-104 is preferably implemented as an execution pipeline having a number of pipeline stages.

During execution within one of execution units 90-104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals the appropriate mapper, which sets an indication to indicate that the register file register(s) assigned to the instruction now contains the architected state of the register. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by branch logic 36. If the path addresses match, branch logic 36 updates its prediction facilities, if necessary. If, however, the calculated path address does not match the predicted path address, BEU 92 supplies the correct path address to IFAR 30, and branch logic 36 updates its prediction facilities, as described further below. In either event, the branch instruction can then be removed from BIQ 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from FXIQ 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Figure 2:
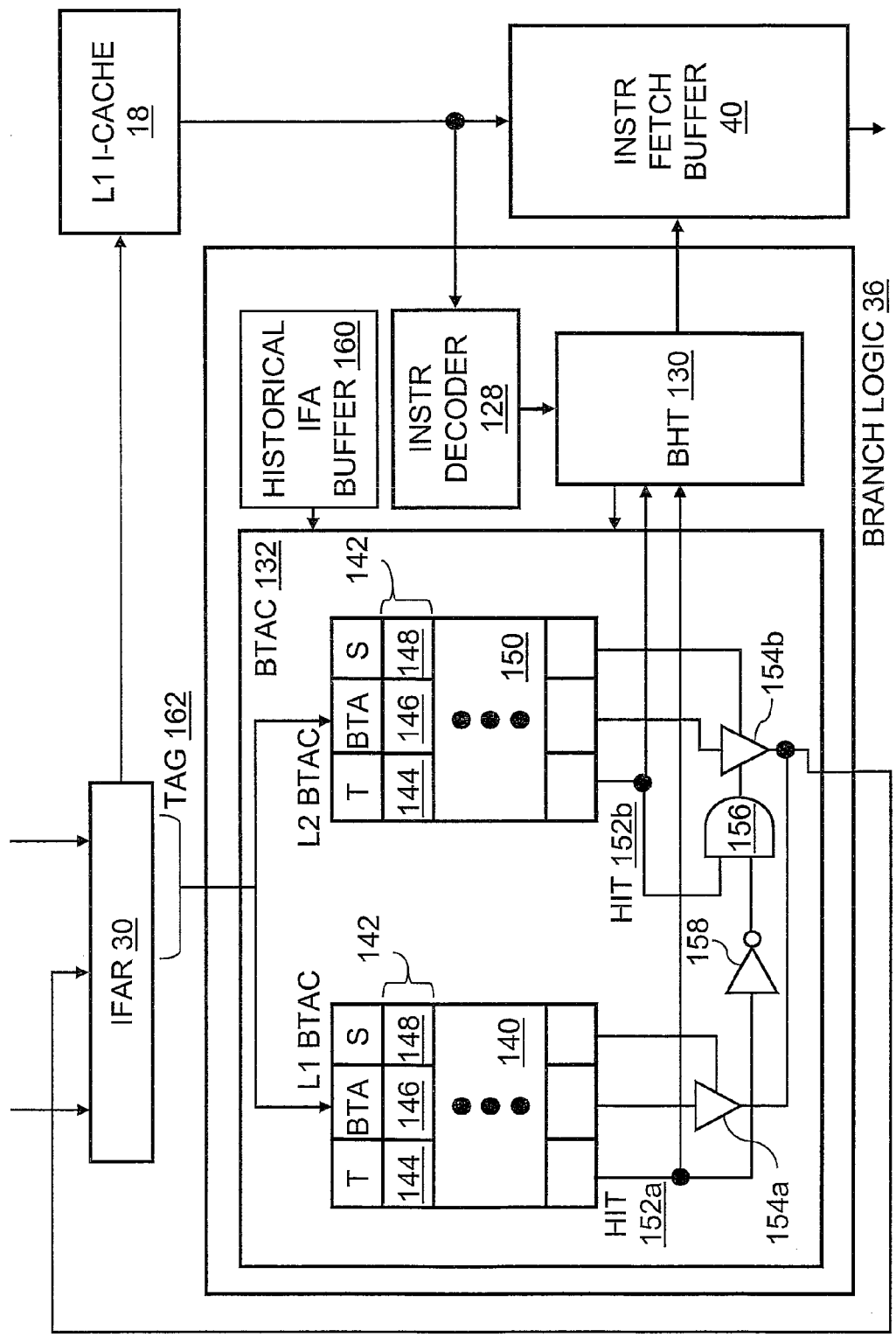
FIG. 2 is a more detailed block diagram of the Branch Target Address Cache (BTAC) within the data processing system of FIG. 1.

Referring now to FIG. 2, there is depicted a more detailed block diagram of an exemplary embodiment of branch logic 36 of FIG. 1 in relation to other components of instruction sequencing logic 13. In the illustrated embodiment, branch logic 36 includes a historical instruction fetch address (IFA) buffer 160 that buffers one or more previous values of IFAR 30, an instruction decoder 128, branch direction prediction circuitry, such as branch history table (BHT) 130, and branch target address prediction circuitry, such as branch target address cache (BTAC) 132. In alternative embodiments of the present invention, the branch direction prediction circuitry can be implemented utilizing any other type of branch direction prediction circuitry, including without limitation, static branch prediction circuitry or two-level dynamic branch prediction circuitry. In addition, the branch target address prediction circuitry can also be implemented utilizing other known or future developed branch target address prediction circuitry, such as a branch target buffer (BTB). Further, in some embodiments, the physical structures utilized for branch direction prediction and branch target address prediction may be merged. The present invention is equally applicable to all such embodiments.

Instruction decoder 128 is coupled to receive each cache line of instructions as it is fetched from L1 I-cache 18 and placed in instruction fetch buffer 40. Instruction decoder 128 scans each cache line of instructions for branch instructions, and in response to detecting a branch instruction, forwards the branch instruction to the branch direction prediction circuitry (e.g., BHT 130) for direction prediction. As further indicated by the connection between BHT 130 and instruction fetch buffer 40, in the event BTAC 132 invokes fetching along a path that BHT 130 predicts as not-taken, BHT 130 cancels the instructions in the incorrect path from instruction fetch buffer 40 and redirects fetching along the sequential path.

As shown, the branch target address prediction circuitry (hereinafter, referred to as BTAC 132) is implemented with a hierarchical, multiple-level organization including N levels, where N is an integer representing the access latency in processor clock cycles of the slowest level of storage in the multi-level hierarchy. In the depicted embodiment, which includes two levels of BTAC, the smaller Level 1 (L1) BTAC 140 has one-cycle access latency and stores branch target addresses of the next block of instructions to be fetched immediately following detection of a branch instruction, and the larger Level 2 (L2) BTAC 150 has two-cycle access latency and stores addresses of instruction blocks to be fetched in the processor clock cycle following fetching of the next instruction block. In other embodiments containing one or more additional larger levels of BTAC, a Level 3 (L3) BTAC would have three-cycle access latency and store the branch target addresses of instruction blocks that will be fetched three cycles after a branch instruction is detected and so on.

Each of L1 BTAC 140 and L2 BTAC 150 includes multiple entries 142, each including a tag (T) field 144 for storing a tag portion of an instruction fetch address (IFA), a branch target address (BTA) field 146 for storing a BTA, and a state (S) field 148 indicating state information for the entry 142. In various embodiments, state field 148 may simply indicate validity of its entry 142 or may alternatively or additionally provide a score indicating a confidence in the correctness of the BTA.

In operation, all levels of BTAC (e.g., L1 BTAC 140 and L2 BTAC 150) are accessed by the tag 162 of the IFA in IFAR 30 in parallel with the access to L1 I-cache 18. As noted above, the result of the access to L1 BTAC 140 is output in the processor clock cycle immediately following the access, and the result of the access to L2 BTAC 150 is output two cycles after the access. If tag 162 of the IFA in IFAR 30 does not match the contents of any tag field 144 of any entry 142 in L1 BTAC 140 or L2 BTAC 150, L1 BTAC 140 and L2 BTAC 150 deassert their respective hit signals 152a and 152b. If, on the other hand, tag 162 matches the contents of a tag field 144 of an entry 142 in one or both of L1 BTAC 140 and L2 BTAC 150, each BTAC level in which a hit occurs asserts its hit signal 152a or 152b and outputs the BTA associated with the matching tag field 144. If a hit occurs in L1 BTAC 140, the BTA is qualified at a first buffer 154a by the state information within the state field 148 of the matching entry 142, and if successfully qualified, is presented to IFAR 30 for selection. If a hit alternatively or additionally occurs in L2 BTAC 150, the BTA is qualified at a second buffer 154b by the state information within the state field 148 of the matching entry 142 and additionally by the deassertion of hit signal 152a (as indicated by inverter 158 and AND gate 156). If the BTA output by L2 BTAC 150 is successfully qualified, second buffer 152 presents the BTA output by L2 BTAC 150 to IFAR 30. Thus, if more than one level of BTAC 132 outputs a branch target address prediction in a given processor clock cycle, the result output by the highest (i.e., lowest latency) level of BTAC 132 is used.

BTAC 132 is updated, as needed, when branch prediction is performed. As shown, hit signals 152a, 152b from L1 BTAC 140 and L2 BTAC 150 are passed to the branch direction prediction circuitry (e.g., BHT 130). If the result of the branch direction prediction is an instruction fetch redirect and branch instruction tag 162 missed in both L1 BTAC 140 and L2 BTAC 150, BHT 130 sends an insertion request to a selected level of BTAC 132 to request insertion of a new entry 142 associated the IFA with the branch target address to which fetching was redirected. Alternatively, if the result of the branch direction prediction is not an instruction fetch redirect (i.e., the branch is predicted as not taken) and branch instruction tag 162 hit in one or both of L1 BTAC 140 and L2 BTAC 150, BHT 130 sends an invalidation request to remove the incorrect branch target address prediction from BTAC 132. In a preferred embodiment, when a BTAC insertion or invalidation request is generated, the request is sent to the lowest level of BTAC 132 for which a corresponding IFA resides in historical IFA buffer 160. Thus, in the case of a two-level BTAC 132, BHT 130 transmits the invalidation or insertion request to L2 BTAC 150 if the IFA immediately preceding the IFA of the predicted branch is still buffered in historical IFA buffer 160 when the insertion or invalidation request is generated. If the IFA immediately preceding the IFA associated with the predicted branch is not still buffered in historical IFA buffer 160, BHT 130 directs the insertion or invalidation request to L1 BTAC 140. Further details regarding the operation of BTAC 132 are described below with reference to FIGS. 3-5.

Figure 3:
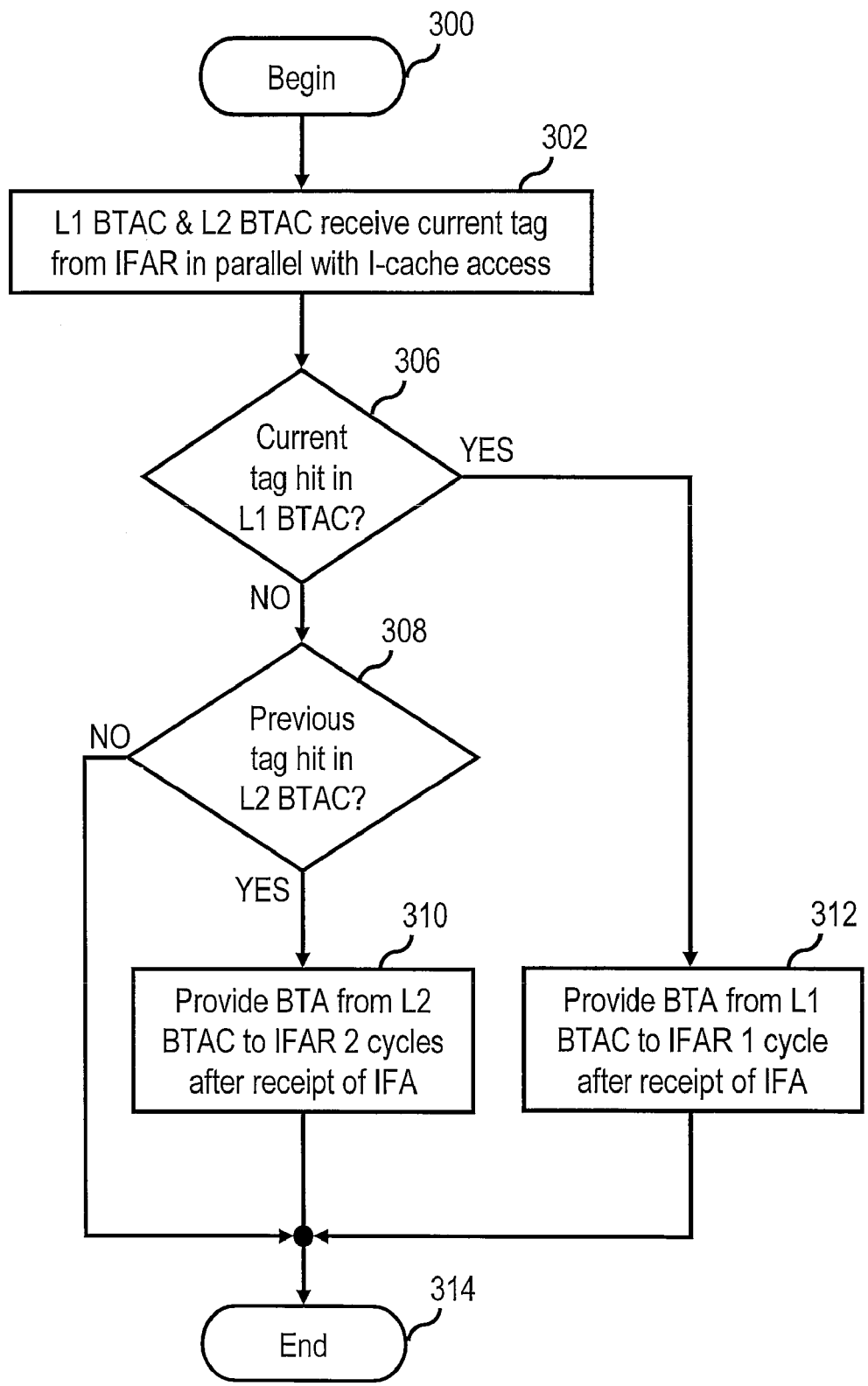
FIG. 3 is a high level logical flowchart of an exemplary method by which a Branch Target Address Cache (BTAC) generates instruction fetch addresses in accordance with the present invention.

With reference now to FIG. 3, there is illustrated a high level logical flowchart of an exemplary method by which BTAC 132 generates and outputs speculative branch target addresses in accordance with the present invention. The depicted process begins at block 300 and then proceeds to block 302, which illustrates BTAC 132 receiving the tag 162 of the instruction fetch address (IFA) in IFAR 30 concurrently with the transmission of the IFA to L1 I-cache 18 to initiate a fetch of an instruction block. In response to receipt of tag 162 by BTAC 132, L1 BTAC 140 and L2 BTAC 150 are accessed concurrently to determine if tag 162 hits in an entry 142, that is, whether the tag 162 matches the contents of any of tag fields 144 of entries 142. Because the various levels of BTAC 132 have differing access latencies as described above, the results of the lookups in the different levels of BTAC 132 are obtained at different times. In particular, for the two-level BTAC embodiment shown in FIG. 2, L1 BTAC 140 outputs the results of a lookup of a "current" tag 162 during the same processor clock cycle in which L2 BTAC 150 outputs the results of a lookup of the immediately previous tag 162.

If the "current" tag 162 hits in L1 BTAC 140 (and the resulting hit signal 152a is successfully qualified by the contents of the state field 148 of the matching entry 142), the process proceeds to block 312. Block 312 depicts BTAC 132 presenting to IFAR 30 in the processor clock cycle immediately following receipt by BTAC 132 of the current tag 162 the predicted branch target address output by L1 BTAC 140. However, if the current tag 162 misses in L1 BTAC 140 and the immediately previous tag 162 hits in L2 BTAC 150 as shown at block 308 (and the resulting hit signal 152b is successfully qualified by the contents of the state field 148 of the matching entry 142), the process proceeds to block 310. Block 310 illustrates BTAC 132 presenting to IFAR 30 the predicted branch target address output by L2 BTAC 150 two processor clock cycles following receipt by BTAC 132 of the previous tag 162. Following either block 310 or block 312, or following a negative determination at both of blocks 306 and 308, the process illustrated in FIG. 3 terminates at block 314 until a next tag 162 is received by BTAC 132.

Figure 4A:
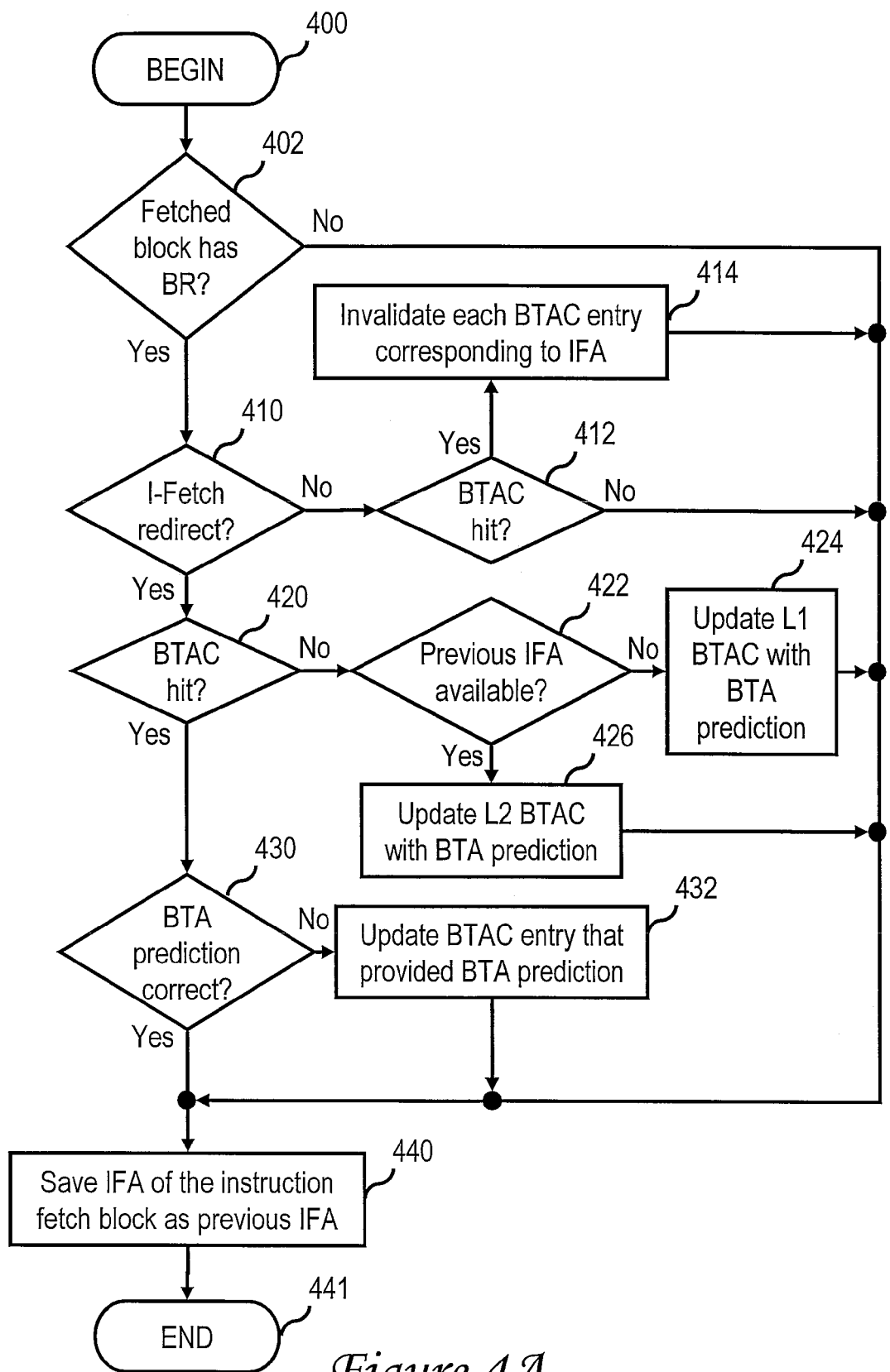
FIG. 4A is a high level logical flowchart of an exemplary method by which the branch target address predictions within the BTAC are updated by branch logic in accordance with the present invention.

Referring now to FIG. 4A, there is illustrated a high level logical flowchart that depicts an exemplary method by which the branch target address predictions within BTAC 132 are updated in accordance with the present invention. The process begins at block 400 of FIG. 4 and then passes to block 402, which depicts branch logic 36 determining whether or not a block of instructions (e.g., a 32 byte cache line) fetched from L1 I-cache 18 includes a branch instruction. If not, no update to BTAC 36 is made. The process shown in FIG. 4 therefore passes from block 402 to block 440, which depicts branch logic 36 saving the IFA of the instruction fetch block as the previous IFA within historical IFA buffer 160 at block 440. The process thereafter terminates at block 441 until a subsequent instruction block is fetched.

Returning to block 402, if branch logic 36 determines at the 402 that the fetched instruction block includes a branch instruction, the process proceeds to block 410. Block 410 depicts branch logic 36 determining whether the fetched instruction block contains an unconditional taken branch or a conditional branch predicted as "taken" by BHT 130. If so, the process proceeds from block 410 to block 420, which is described below. If not, the process passes to block 412, which depicts branch logic 36 determining from hit signals 152a, 152b whether the tag 162 of the IFA hit in one or more levels of BTAC 132. If not, no update to BTAC 132 is made, and the process passes from block 412 to blocks 440-441, which have been described. If, however, a determination is made at block 412 that tag 162 hits in one or more levels of BTAC 132, meaning that BTAC 132 has at least one entry predicting a redirect target address for a fetched instruction block containing no branch that would cause a fetch redirect, branch logic 36 invalidates each entry 142 in BTAC 132 (i.e., in L1 BTAC 140 and/or L2 BTAC 150) matching tag 162

(block 414). Such invalidation may be performed, for example, by updating the state field(s) of the relevant entry or entries 142. Thereafter, the process passes to blocks 440-441, which have been described.

Referring now to block 420, if branch logic 36 determines that a branch instruction within the fetched instruction block was either unconditionally "taken" or predicted as "taken" and tag 162 hit in BTAC 132, the process proceeds to block 430, which is described below. If, however, branch logic 36 determines at block 420 that a branch instruction within the fetched instruction block was "taken" and tag 162 missed in BTAC 132, the process proceeds to block 422. Block 422 illustrates branch logic 36 determining whether historical IFA buffer 160 buffers the previous IFA immediately preceding the IFA that generated the fetch of the instruction block containing the taken branch instruction in question. IFA buffer 160 may not buffer the IFA for a number of reasons, including occurrence of a reboot of the machine, a context switch, or a pipeline flush.

If branch logic 36 determines at block 422 that the previous IFA is not available, branch logic 36 inserts within L1 BTAC 140 a new entry 142 containing the tag portion of the current IFA in tag field 144 and the branch target address predicted by BHT 130 in BTA field 146. If, on the other hand, branch logic 36 determines at block 422 that historical IFA buffer 160 still retains the previous IFA immediately preceding the current IFA that generated the fetch of the instruction block containing the conditional branch instruction in question, branch logic 36 inserts within L2 BTAC 140 a new entry 142 containing the tag portion of the previous IFA in tag field 144 and the branch target address predicted by BHT 130 in BTA field 146. Following either of blocks 424 and 426, the process passes to blocks 440-441, which have been described.

With reference now to block 430, if branch logic 36 determines that the fetched instruction block contains a taken branch and tag 162 hit in BTAC 132, branch logic 36 further determines whether the BTA prediction is confirmed as correct by BHT 130. If so, no update to BTAC 132 is required, and the process proceeds to blocks 440-441, which have been described. If, however, BHT 130 indicates at block 430 that the BTA predicted by BTAC 132 was incorrect, branch logic 36 updates the BTA field 146 of the entry 142 that provided the incorrect BTA prediction with the correct BTA (block 432). Thereafter, the process proceeds to blocks 440-441, which have been described.

Figure 4B:
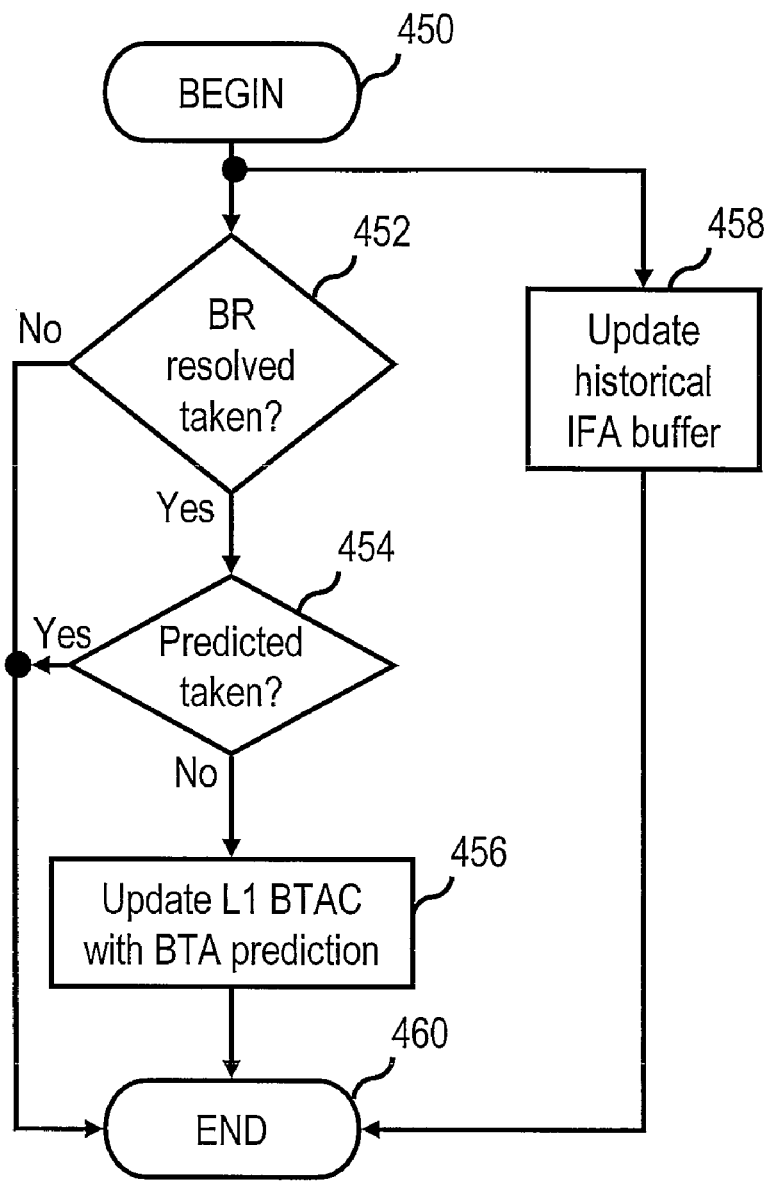
FIG. 4B is a high level logical flowchart of an exemplary method by which the branch target address predictions within the BTAC are updated in response to operation of a branch execution unit in accordance with the present invention.

With reference now to FIG. 4B, there is illustrated a high level logical flowchart of an exemplary process by which BEU 92 updates branch target address predictions in branch unit 36, if necessary, in response to resolution of predicted branches. The process begins at block 450 and then proceeds to blocks 452 and 454, which together depict BEU 92 determining whether a branch it resolved as "taken" was correctly predicted by BHT 130 as "taken." If a determination is made at blocks 452 and 454 that the branch resolved by BEU 92 as "taken" was correctly predicted by BHT 130, then BEU 92 does not update the branch target address predictions in branch unit 36, and the process ends at block 460. If, however, BEU determines at blocks 452 and 454 that the branch resolved by BEU 92 as "taken" was mispredicted by BHT 130 as "not-taken," the process proceeds to block 456. Block 456 depicts BEU 92 inserting within L1 BTAC 140 a new entry 142 containing the tag portion of the IFA of the instruction fetch block including the resolved branch in tag field 144 and containing the correct branch target address calculated by BEU 92 in BTA field 146. Thereafter, the process shown in FIG. 4B ends at block 460. Concurrently with the operations shown at blocks 452-456, BEU 92 also places the IFA of the instruction fetch block containing the resolved branch in historical IFA buffer 160, displacing a previous IFA if necessary (block 458).

Figure 5:
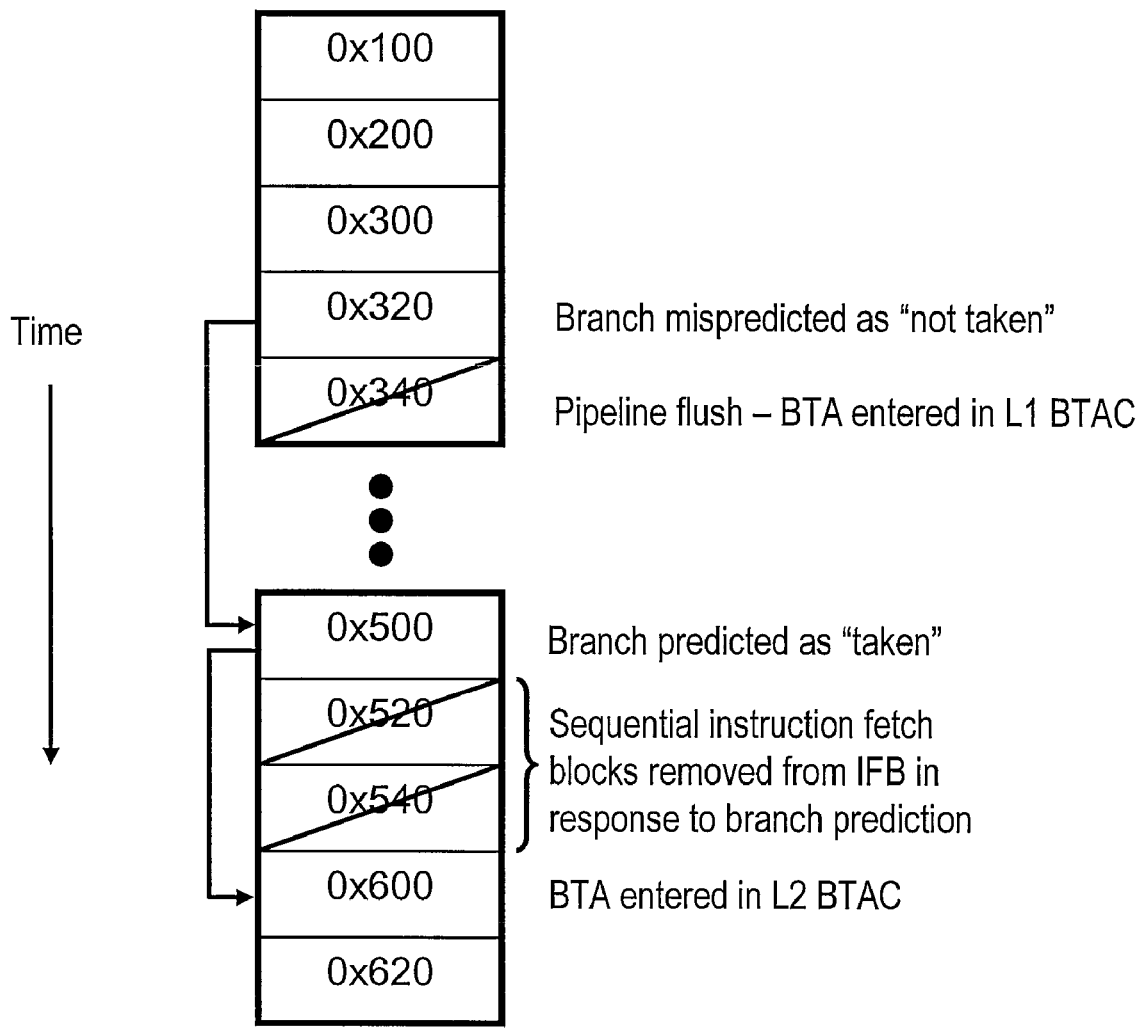
FIG. 5 depicts an exemplary instruction fetch stream represented by the instruction fetch addresses of blocks of instructions fetched from an instruction cache in consecutive processor clock cycles in accordance with the present invention.

Referring now to FIG. 5, there is depicted an exemplary instruction fetch stream represented by the instruction fetch addresses (IFAs) of blocks of instructions fetched from L1 I-cache 18 in consecutive processor clock cycles. In the depicted example, each instruction fetch block is assumed to be 32 bytes in length, and IFAs are represented in hexadecimal.

As initial conditions, it should be assumed that L1 BTAC 140 contains an entry 142 associating the tag of the IFA 0x100 with the branch target address of 0x200. The entry 142 in L1 BTAC 140 containing this BTA prediction can thus be expressed as 0x100=>0x200. It should further be assumed that L2 BTAC 150 contains an entry 142 associating the tag of the IFA 0x100 with the branch target address of 0x300, which can be expressed as 0x100=>0x300.

If a conditional branch instruction residing in the instruction fetch block identified by the IFA 0x320 is predicted by BHT 130 as "not taken" and later resolved by BEU 92 as "taken," branch logic 132 performs a pipeline flush in response to the detection of this misprediction. Thus, the instruction fetch block identified by IFA 0x340 and possibly one or more additional sequential instruction fetch blocks are removed from instruction fetch buffer 40 by branch logic 36. After the pipeline flush, the instruction fetch begins from the correct branch target address 0x500, and branch logic 132 inserts the BTA prediction 0x320=>0x500 into L1 BTAC 140, as described above with respect to block 424 of FIG. 4. Assuming that the instruction fetch block corresponding to IFA 0x500 contains a conditional branch instruction that BHT 130 predicts as taken, the sequential fetched instruction blocks corresponding to IFAs 0x520 and 0x540 (which are fetched from L1 I-cache 18 during branch scan and direction prediction) are removed from instruction fetch buffer 40 by branch logic 36. In addition, because the previous IFA 0x320 is available within historical IFA buffer 160, branch logic 36 inserts the BTA prediction 0x320=>0x600 into a new entry 142 in the L2 BTAC 150, as described above with reference to block 426 of FIG. 4.

As has been described, the present invention provides a data processing system, processor and method of data processing in which an improved branch target address cache (BTAC) is utilized to generate branch target address predictions. In accordance with the present invention, the BTAC includes multiple hierarchical levels of storage having differing access latencies. In a preferred embodiment, the highest level of BTAC is restricted in size to permit access in a single processor clock cycle.

While the invention has been particularly shown as described with reference to a preferred embodiment, it will be understood by those skilled in the art that various changes in form and detail may be made therein without departing from the spirit and scope of the invention.

What is claimed is:
1. A processor, comprising:
at least one execution unit that executes instructions; and
instruction sequencing logic, coupled to the at least one execution unit, that fetches instructions from a memory system for execution by the at least one execution unit, said instruction sequencing logic including a branch logic that outputs predicted branch target addresses for use as instruction fetch addresses, said branch logic including a level one branch target address cache (BTAC) and a level two BTAC each having a respective plurality of entries each associating at least a tag with a predicted branch target address;

wherein said branch logic accesses the level one BTAC and the level two BTAC in parallel with at least a tag portion of a first instruction fetch address to obtain a first predicted branch target address from the level one BTAC and a second predicted branch target address from the level two BTAC;

wherein the instruction sequencing logic fetches instructions from the memory system utilizing the first predicted branch target address as a second instruction fetch address in a first processor clock cycle and fetches instructions from the memory system utilizing the second predicted branch target address as a third instruction fetch address in a second processor clock cycle subsequent to the first processor clock cycle.

2. The processor of claim 1, wherein:
the level one BTAC has a single cycle access latency.

3. The processor of claim 1, wherein:
said branch logic includes N levels of BTAC, wherein N is an integer greater than or equal to two; and
each of the N levels of BTAC has a respective access latency different from that of each other level of BTAC.

4. The processor of claim 3, wherein the branch logic, if the N levels of BTAC output multiple different predicted branch target addresses identifying multiple different instruction fetch blocks in a same processor clock cycle, selects a predicted branch target address output by a highest level of BTAC to be presented as an instruction fetch address.

5. The processor of claim 3, wherein:
the at least one execution unit includes a branch execution unit that executes branch instructions;
the branch execution unit reports outcomes of executed branch instructions to the branch logic; and
the branch logic inserts a new branch target address prediction into a selected level among the N levels of BTAC based upon the reported outcome of an executed branch instruction.

6. The processor of claim 5, wherein:
the branch logic includes a buffer that holds at least one previous instruction fetch address; and
the branch logic selects the selected level based upon availability in the buffer of a particular previous instruction fetch address corresponding to the new branch target address prediction.

7. The processor of claim 1, wherein:
the branch logic includes branch direction prediction logic; and
the branch logic invalidates a branch target address prediction residing in a selected level among the N levels of BTAC based upon a branch direction prediction of the branch direction prediction logic.

8. The processor of claim 1, wherein:
the memory system includes a cache memory within the processor; and
the instruction sequencing logic accesses the level one BTAC, the level two BTAC, and the cache memory concurrently with the first instruction fetch address.

9. A data processing system, comprising:
the processor of claim 1;
an interconnect coupled to the processor; and
the memory system coupled to the interconnect.

10. A method of data processing in a processor including at least one execution unit and an instruction sequencing logic containing branch logic, the branch logic including a level one branch target address cache (BTAC) and a level two BTAC, said method comprising:

fetching a first instruction from a memory system for execution by at least one execution unit of the processor utilizing a first instruction fetch address;

the branch logic accessing the level one BTAC and the level two BTAC in parallel with at least a tag portion of the first instruction fetch address;

in response to said accessing:
outputting a first predicted branch target address from the level one BTAC;
outputting a second predicted branch target address from the level two BTAC; and
fetching a second instruction from the memory system utilizing the first predicted branch target address as a second instruction fetch address in a first processor clock cycle and fetching a third instruction from the memory system utilizing the second predicted branch target address as a third instruction fetch address in a second processor clock cycle subsequent to the first processor clock cycle.

11. The method of claim 10, wherein said first processor clock cycle immediately follows a previous clock cycle in which the branch logic accesses the level one BTAC.

12. The method of claim 10, wherein:
said branch logic includes N levels of BTAC, wherein N is an integer greater than or equal to two; and
each of the N levels of BTAC has a respective access latency different from that of each other level of BTAC.

13. The method of claim 12, and further comprising:
said level two BTAC outputting a third predicted branch target address in the first processor clock cycle; and
the branch logic selecting the first predicted branch target address output by the level one BTAC rather than said third predicted branch target address as said second instruction fetch address, wherein the first and third predicted branch target addresses identify different instruction fetch blocks.

14. The method of claim 12, wherein the at least one execution unit includes a branch execution unit that executes branch instructions, said method comprising:
the branch execution unit reporting outcomes of executed branch instructions to the branch logic; and
the branch logic inserting a new branch target address prediction into a selected level among the N levels of BTAC based upon the reported outcome of an executed branch instruction.

15. The method of claim 14, wherein the branch logic includes a buffer that holds at least one previous instruction fetch address, said method comprising:
the branch logic selecting the selected level based upon availability in the buffer of a particular previous instruction fetch address corresponding to the new branch target address prediction.

16. The method of claim 10, wherein the branch logic includes branch direction prediction logic, said method further comprising:
the branch logic invalidating a branch target address prediction residing in a selected level among the N levels of BTAC based upon a branch direction prediction of the branch direction prediction logic.

17. The method of claim 10, wherein the memory system includes a cache memory within the processor, said accessing further comprising:
accessing the level one BTAC, the level two BTAC, and the cache memory concurrently with the first instruction fetch address.

* * * * *